J. P. CLARE.
TIRE FOR VEHICLES.
APPLICATION FILED FEB. 17, 1911.

1,033,229.

Patented July 23, 1912.

2 SHEETS—SHEET 1.

WITNESSES:
M. E. Flaherty
George Langton

INVENTOR:
James P. Clare
By Crace + Hayes
his attorneys.

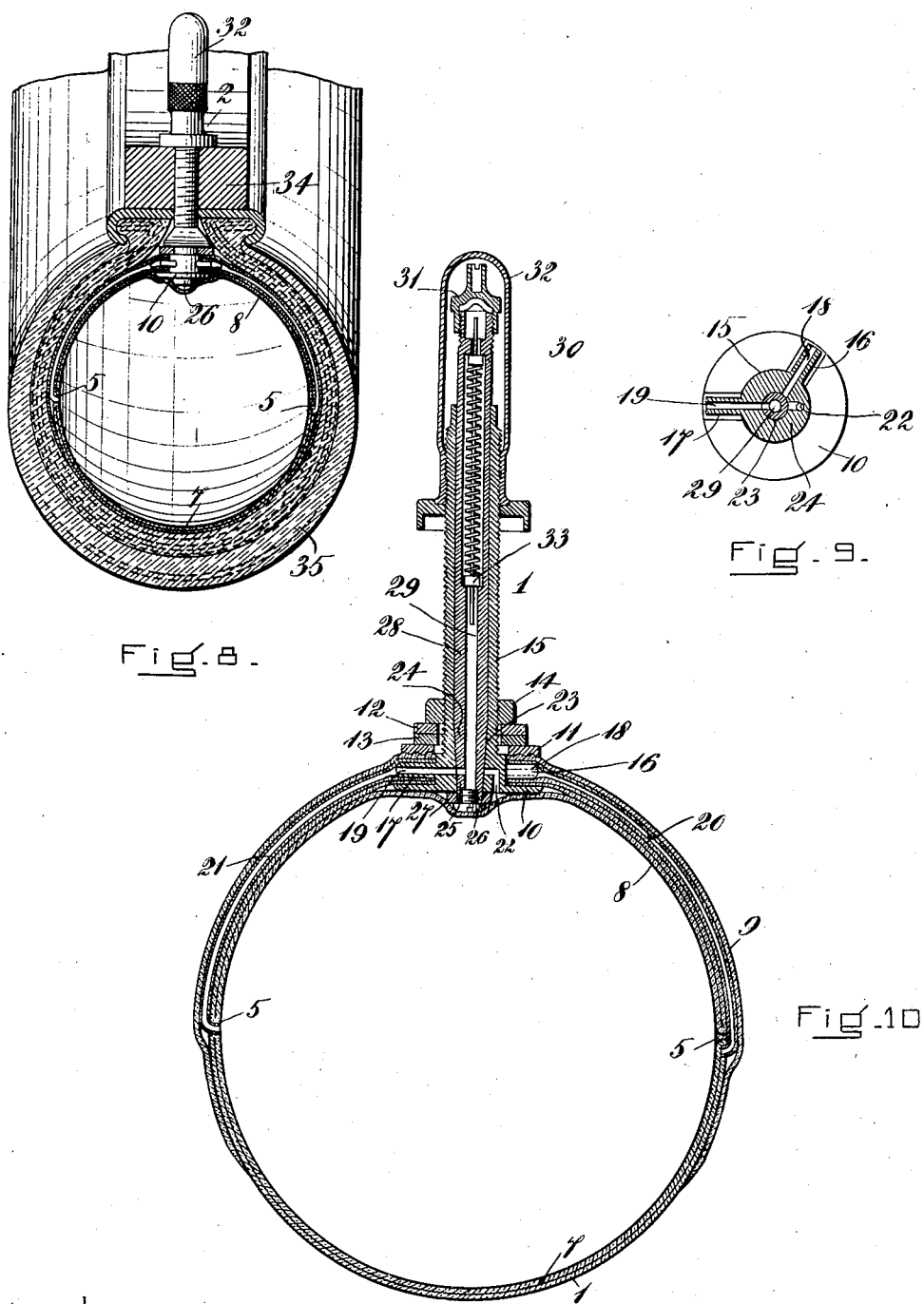

UNITED STATES PATENT OFFICE.

JAMES P. CLARE, OF STRATHAM, NEW HAMPSHIRE.

TIRE FOR VEHICLES.

1,033,229.  Specification of Letters Patent.  Patented July 23, 1912.

Application filed February 17, 1911. Serial No. 609,139.

*To all whom it may concern:*

Be it known that I, JAMES P. CLARE, of Stratham, in the county of Rockingham and State of New Hampshire, a citizen of the United States, have invented a new and useful Improvement in Tires for Vehicles, of which the following is a full, clear, and exact description, reference being had to the accompanying drawings, forming a part of this specification, in explaining its nature.

My invention relates essentially to those types of tire known as pneumatic tires and especially to those types of pneumatic tires known as inner tube tires.

It is among the objects of my invention to provide whereby the tire or rather that part forming the interior or inflatable inner tube portion of the tire may have a plurality of compartments each separately inflatable and each when inflated acting to inflate and give form to the entire tube or tire with the resulting advantage that in case of puncture of the wall forming one of the compartments the tube or tire need not be detached from the wheel in connection with which it is used but another compartment may be inflated, the tire only necessarily being removed from the wheel when all of the compartments have been successively inflated and the walls forming these compartments punctured.

It is a further object of my invention to provide whereby a tire or tube of the above construction may be easily made; to provide also whereby the walls forming the several compartments of the tube or tire may be inflated without undue extension or stretching thereof; to provide also whereby the tube or tire may be made up of separate tubes so combined that at least two of the separate compartments formed thereby (three compartments being preferably provided) may be formed by each one of the separate tubes and the combined tubes may form the third compartment.

A still further object of my invention is to provide an improved means whereby the separate compartments of the tube or tire may be separately inflated.

I have shown an embodiment of my invention in the accompanying drawings, in which—

Figure 1:
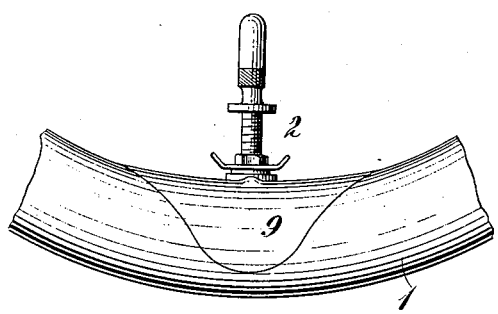
Figure 2:
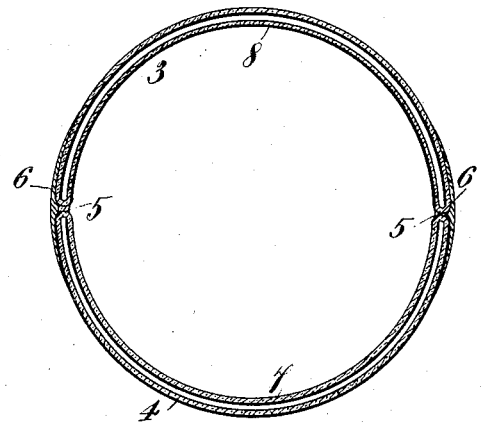
Figure 4:
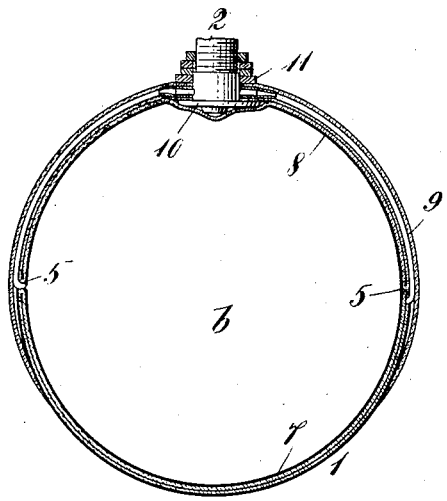
Figure 3:
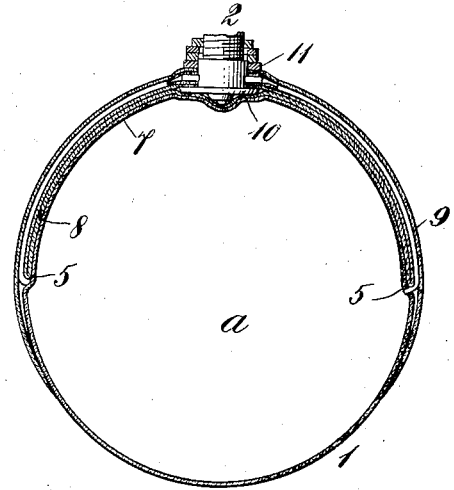
Figure 6:
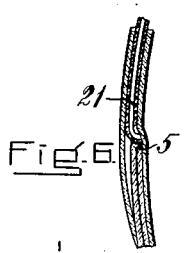
Figure 5:
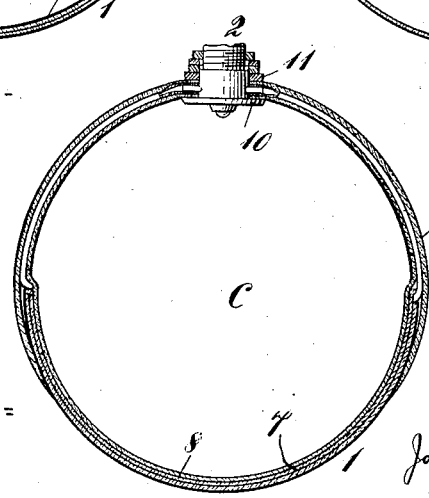

Figure 1 shows in side elevation a portion of a tube or tire embodying my invention. Fig. 2 is a section showing the method of arranging the tubes for forming the tire. Figs. 3, 4 and 5 are sections showing, respectively, the various compartments of the tire and the manner of forming and inflating the same. Fig. 6 is a section of the tire and shows especially in detail the air inlet portion or stem thereof, which is shown in cross vertical section. Fig. 7 is a section taken on the line 7—7 of Fig. 6. Fig. 8 shows in cross section the tire applied to the rim of a wheel, a portion only of which is shown for illustrating the mode of application. Fig. 9 is a detail view partly in cross section and partly in plan of the tire valvular device. Fig. 10 is an enlarged cross sectional view of the tire and valve.

Referring to the drawings:—1 represents the body of the tire and by the expression "tire" as used herein and in the appended claims I wish to include either an inflatable tire in the generally accepted meaning of the term or the inflatable inner portion thereof usually referred to as the "inner tube" especially where such is made a removable part and is contained within a protecting and retaining envelop or case.

2 represents the stem of the tire through which stem air is introduced for inflating the tire as will hereinafter be explained.

The body 1 of the tire comprises an outer wall and is made preferably to assume when inflated a tubular form or such form as suits it for the purposes for which it is designed. The body 1 of the tire is made up of portions of separate combined tubes 3 and 4. These tubes are preferably made of rubber and they are combined by bringing together the opposite side edges of the separate tubes to form joints 5 as diagrammatically shown in Fig. 2. The opposite side edges of the tube may be brought together by bending the tubes around a mandrel (not shown). The tubes are secured together at the points of the joints 5 preferably by vulcanizing although the tubes may be reinforced by strips 6 applied thereto at the points of the respective joints. In practice, however, I have found that merely vulcanizing the edges of the tubes together at the points of the respective joints is sufficient.

The disposition and arrangement of the separate tubes when combined and united as aforesaid is such that the portions of the tubes other than those forming the body of the tire will form inside said body separate partitions 7 and 8, respectively, which connect with the body of the tire on opposite sides thereof at the points of the respective joints 5. The partitions 7 and 8 form with one another and with the body of the tire separate inflatable compartments $a$, $b$ and $c$, all located within said body, in which connection it will be observed that two of these compartments, namely,—the compartments $a$ and $c$, are formed entirely by the separate tubes, and the other compartment, $b$, is formed by and between the combined tubes. In other words, relatively to the joints 5, 5, and tire as made, the compartment $a$ will be formed by and between the outer portion of the body of the tire on the one side and on the other by the partition 7; the compartment $b$ will be formed by and between the partitions 7 and 8; and the compartment $c$ by and between the inner portion of the body of the tire on the one side and the partition 8 on the other. The disposition and arrangement of the combined tubes is also such that the partitions formed inside the body of the tire are in width substantially equal to one another and each substantially equal also to one half of the circumferential extent of the interior of the body of the tire, the circumferential extent of the combined partitions when forming the interior compartment $b$ as aforesaid being substantially equal to that of the interior of the body of the tire. In other words, when air is introduced into the compartment $a$ for inflating the tire the partition 7 will be moved in against the partition 8 and both partitions in against the interior of the inner portion of the body of the tire; when the compartment $b$ is filled with air for inflating the tire the partition 7 will be moved out against the interior of the outer portion of the body of the tire and the partition 8 inwardly against the interior of the inner portion of the body of the tire, and when air is introduced into the compartment $c$ for inflating the tire the partition 8 will be moved out against the partition 7 and both partitions moved outwardly against the interior of the outer portion of the body of the tire, all of the said compartments being severally filled with air for inflating the tire without undue extension or stretching of the parts forming these compartments or strain upon the joints of the tire.

It is necessary of course that the several compartments of the tire be independently inflatable and I have provided means whereby this may be done through the stem 2 of the tire. At the point of the stem 2 the body of the tire is thickened by a reinforcement or patch 9. The stem 2 extends through the wall of the tire and patch 9 and is secured thereto by clamp members 10 and 11, respectively. The clamp member 10 is fixed to the bottom end of the stem 2 and located inside the body of the tire while the clamp 11 fits hard against the outside of the body of the tire or patch secured to it at a point opposite the clamp 10. The clamp 11 is retained by a keeper 12 and interposed washer 13 pressed down and secured by a lock nut 14 threaded upon the body of the stem. The body of the stem is hollow. Near its bottom end, just adjacent to the clamp 10 and preferably secured thereto, is a hub 15 forming a part of the stem and located between the two clamp members when in place. Projecting from this hub on opposite sides thereof in the direction of the two sides of the tire are nipples 16 and 17, respectively. The passages 18 and 19, respectively, are formed through these respective nipples and communicate with the hollow interior of the stem. Secured to the nipple 16 is a tube 20, preferably a flattened tube, which extends down over the face of the tire between it and the patch 9 to the point of the joint 5 on one side of the tire where the tube enters through the joint and into the compartment $a$ of the tire. By means of the tube 20 the passage 18 through the nipple 16 is continued into the compartment $a$ as aforesaid. On the opposite side of the tire there connects with the nipple 17 a tube 21 which extends down over the side of the face of the tire between it and the patch to the point of the joint 5 on this same side where the tube enters through the joint and into the compartment $b$ of the tire. The tube 21 acts to form a continuation of the passage 19 through the stem 17 into the compartment $b$ of the tire as aforesaid. Extending also through the hub 15 from the hollow interior of the stem is a passage 22 which extends laterally from the hollow of the stem into the hub and thence outwardly through the hub and clamp 10 affixed to it, directly into and to communicate directly with the compartment $c$ of the tire. This passage 22 forms accordingly a direct communication between the hollow of the stem and the compartment $c$ of the tire.

The entrances from the hollow of the tire stem into the respective passages 18, 19 and 22, which communicate with the several compartments of the tire are circularly arranged and the interior of the valve stem at this point is made to gradually incline inwardly to form an annular inwardly inclined or beveled valve seat 23. Coöperating with this seat is a valve 24 correspondingly beveled or inclined. The valve is provided with an extension 25 which projects through the bottom end of the tire stem and also through the clamp 11 where it is secured by means of a lock nut 26 and washer 27 interposed between the nut and the clamp 11. The nut 26 when tightened acts to hold the valve snugly onto its valve seat forming an airtight joint. The valve 24 is also provided with a hollow stem 28 which extends upwardly through the stem 1 of the tire and to a point beyond the same. This valve stem preferably fits within the tire stem but so that the valve stem may be turned from a point outside the stem of the tire, for the arrangement is such that by turning the valve stem the valve is turned upon its valve seat. Extending through the valve stem 28 is a passage 29. This passage extends downwardly through the valve stem and thence outwardly through the face of the valve at a point where it may be coincident with the entrances into the respective passages 18, 19 and 22. The stem 28 of the valve at its upper end is provided with a threaded socket 30 for receiving the usual connection for inflating the tire. Normally the passage through the valve stem is closed by means of a cap 31, the whole being inclosed within an external cap 32 which screws onto the threaded exterior of the stem 1 of the tire.

The operation of inflating the tire is substantially like that of inflating any tire excepting that the various compartments $a$, $b$ and $c$ should, when the tire is properly used, be preferably inflated in sequence. In the first instance, assuming the tire to be in place on the rim of a wheel, the caps 32 and 31 are first removed and the valve stem 28 turned to a position where the end of the passage 29 will register with the passage 18 which connects with the compartment $a$ of the tire. The valve will then cover and securely close the passages 19 and 22, respectively, which connect with the compartments $b$ and $c$ of the tire. The air compressor, if not sooner applied, is then applied to the valve stem and air introduced through the passages 29 and 18 into the compartment $a$ of the tire filling this compartment and so inflating the tire as above explained. After the tire has been thus inflated the stem is turned to a point where the outlet from the passage 29 will no longer coincide with the entrance to the passage 18 when the air will be retained within the tire by means of the valve. The air compression means is then removed and the caps 31 and 32 replaced. The tire is then ready for use. When the wall of the compartment $a$ has become punctured then the valve stem is turned to the position where the outlet of the passage 29 will coincide with the passage 19 which connects with the compartment $b$ of the tire, the valve then closing the passages 18 and 22. When the operation of filling the compartment $b$ of the tire has been completed the valve is turned to a position where it will close the passage 17 preventing the escape of air from this compartment. After the wall of the compartment $b$ is punctured the operation is again repeated by turning the valve to a position where the outlet from the passage 29 will coincide with the passage 22 connecting with the compartment $c$ of the tire. After this compartment has been filled with air for inflating the tire the valve is turned to a position where the passage 29 through it will no longer coincide with the passage 22, but will close this passage preventing the escape of air from the compartment $c$ of the tire. After the walls of all three of the compartments have been punctured the tire is removed from the wheel and repair made. Although the valve 24 will act to prevent air from escaping from any one of the compartments of the tire, the close fit of the valve stem within the stem of the tire acting also to assist in the retention of air, yet in order that no air may escape by accident back through the passage 29 and hollow of the valve stem I prefer to locate within the hollow of the valve stem an automatic outwardly-closing inwardly-opening air valve 33. A valve of this character is well known to those skilled in the art and needs no explanation of its construction or operation.
The tire embodying my invention presents substantially the same outward appearance and arrangement as tires now in common use.

In Fig. 8 I have shown a tire like that embodying my invention applied to the rim 34 of a wheel, the tire there shown being an inner tube contained within an envelop or casing 35 retained in the customary manner. It will be seen that the general arrangement and disposition of the parts including the valve stem resemble in external disposition and arrangement tires now in common use. Accordingly tires or tubes embodying my invention need no special adaptation or construction of the parts or rim to which they are applied in order to be used.

Claims for the invention residing in the valvular structure herein described, owing to the requirements of the Patent Office, have been divided out of this application and may be seen by reference to my application for Letters Patent of the United States entitled "Valves for tires," Serial No. 633,361, filed June 15, 1911.

Having thus fully described my invention, I claim and desire to secure by Letters Patent of the United States:—

1. An inflatable tire consisting of two separate combined tubes united to form a body for said tire and inside said body three separate compartments, and which tubes are arranged and united in a manner whereby each of said separate tubes will form a separate compartment and portions of said combined tubes the third one of said compartments, the portions of said combined tubes forming said third compartment being substantially equal to one another in width and having when combined a circumferential extent substantially equal to that of the interior of said body of the tire.

2. An inflatable tire having a body and inside said body separate partitions forming with one another and with said body separate inflatable compartments, said tire consisting of separate combined tubes arranged and united in a manner whereby portions thereof may together form the body of said tire and other portions thereof said partitions and which partitions in width are each substantially equal to one half of the circumferential extent of the interior of said body of the tire.

3. An inflatable tire consisting of a combination of two separate tubes superposed upon one another and united at the opposite sides thereof whereby portions of the combined tubes will together form the body of said tire and other portions separate partitions inside said body forming separate inflatable compartments, one of said compartments being formed by and between said partitions, the portions of said tubes forming this compartment having each substantially the same width and when combined a circumferential extent substantially equal to that of the interior of said body of the tire.

4. An inflatable tire consisting of two separate tubes superposed upon one another and united at the opposite sides thereof whereby each of said tubes will form a separate inflatable compartment and a third inflatable compartment will be formed by and between portions of said combined tubes, the width of the portions of said combined tubes forming said third compartment being substantially equal in width to one another and having when combined a circumferential extent substantially equal to that of the interior of said tire.

5. An inflatable tire having a body and inside said body a partition dividing said body into separate compartments, a patch secured to said body, an air receiving valve stem secured to said body at the point of said patch and having a passage therein connecting directly with one of the interior compartments of said body, said stem having also a further passage leading therefrom over the body of said tire and under said patch and connecting with another compartment of said tire, and means whereby said compartments may be separately inflated from the point of said stem through one or the other of said passages as aforesaid.

JAMES P. CLARE.

Witnesses:
GEORGE W. RAND,
C. B. SHAPARD.